United States Patent
Schaub et al.

(10) Patent No.: US 7,958,028 B2
(45) Date of Patent: Jun. 7, 2011

(54) ENTERPRISE MANAGEMENT APPLICATION PROVIDING AVAILABILITY CONTROL CHECKS ON REVENUE BUDGETS

(75) Inventors: Thomas M. Schaub, Antibes (FR); Andreas Schaefer, Mougins (FR); Horst Schnoerer, Angelbachtal (DE)

(73) Assignee: SAP AG, Walldorf (DE)

( * ) Notice: Subject to any disclaimer, the term of this patent is extended or adjusted under 35 U.S.C. 154(b) by 1118 days.

(21) Appl. No.: 10/743,143

(22) Filed: Dec. 23, 2003

(65) Prior Publication Data

US 2005/0137947 A1 Jun. 23, 2005

(51) Int. Cl.
*G06Q 40/00* (2006.01)
(52) U.S. Cl. .......................................... 705/35
(58) Field of Classification Search .................. None
See application file for complete search history.

(56) References Cited

U.S. PATENT DOCUMENTS

| | | | |
|---|---|---|---|
| 5,317,504 A | 5/1994 | Nakayama | |
| 6,058,375 A * | 5/2000 | Park | 705/30 |
| 7,107,268 B1 * | 9/2006 | Zawadzki et al. | 707/9 |
| 2004/0054562 A1 * | 3/2004 | Tanaka | 705/7 |

OTHER PUBLICATIONS mySAP Public Sector in SAP R/3 Enterprise, at www.sap.com/belux/industries/publicsector/pdf/BWP_functions_detail.pdf, Jun. 2003.*

Biggs, Maggie, CASE tool makes for quick, methodical development, Infoworld, Dec. 9, 1996, 1 pg.*

Davidson, Susan et al., Consistencyin Partitioned Networks, Computing Surveys, vol. 17, No. 3, Sep. 1985.*

Hallberg, Bruce A., Sherry Kinkoph, and Bill Ray. Using Microsoft Excel 97. Special Edition. Indiana: Que, 1997: 204, 216, 460-465. 467-469.

Hallberg, Bruce A., Sherry Kinkoph, and Bill Ray. Using Microsoft Excel 97. Special Edition. Indiana: Que, 1997—Additional Pages.

* cited by examiner

*Primary Examiner* — James A Kramer
*Assistant Examiner* — Carol See
(74) *Attorney, Agent, or Firm* — Kenyon & Kenyon LLP

(57) ABSTRACT

A budgetary control system limits revenue generating transactions that may be entered in an enterprise management system. When a new revenue posting is proposed to the system, various AVC rules are evaluated. The evaluation compares the revenue posting against predetermined budgetary limits. The AVC rules may address various nodes within a revenue postings data structure and within a revenue budget data structure and they may define a test relationship that must be maintained between them. If proposed revenue posting would violate the test relationship of an AVC rule, then the revenue posting may be rejected from the system depending upon the contents of a response field in the AVC rule. Some AVC rules mandate that a violation cause the proposed transaction to be blocked while others may generate a warning notification within the system but admit the new transaction despite the violation.

12 Claims, 3 Drawing Sheets

200

| CONTROL OBJECT | SOURCE ADDRESS 320 | TEST 330 | RESPONSE 340 | |
|---|---|---|---|---|
| A1 | [A1, A1.1, A1.2] | REV <0.4 BDGT | Error | 310-1 |
| A1 | [A1, A1.1, A1.2] | REV <0.3 BDGT | Warning | 310-2 |
| A2 | [A2] | REV <0.5 BDGT | Error | 310-3 |
| A2.1 | [A2.1] | REV <0.5 BDGT | Error | 310-4 |
| A2.2 | [A2.2] | REV <0.5 BDGT | Error | 310-5 |
| A2.3 | [A2.3] | REV <0.5 BDGT | Error | 310-6 |
| A2.4 | [A2.4] | REV <0.5 BDGT | Error | 310-7 |

300

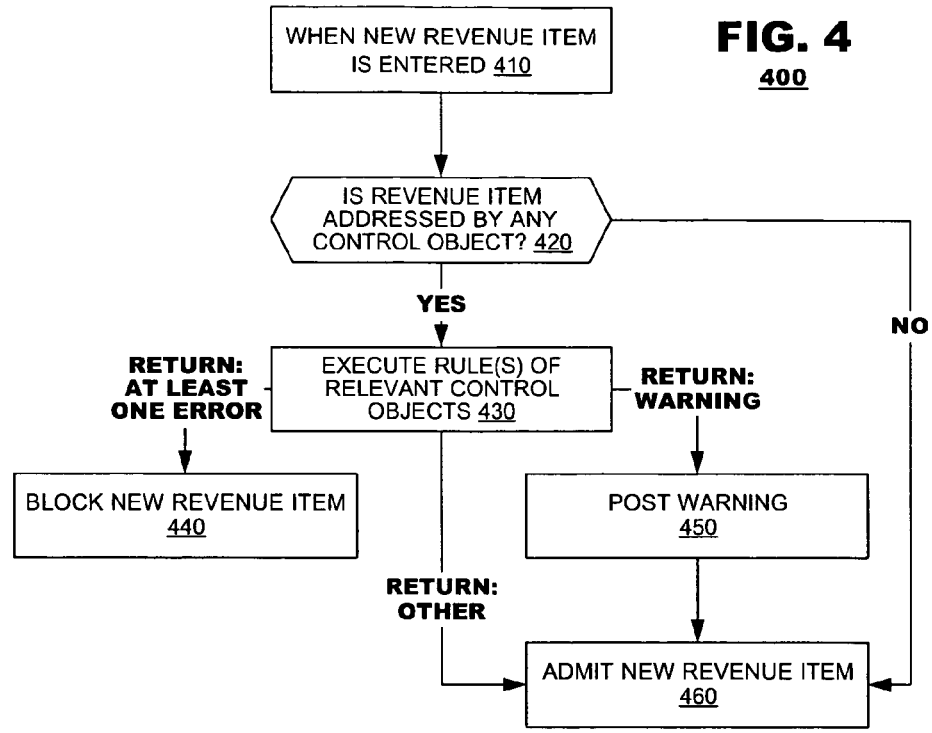
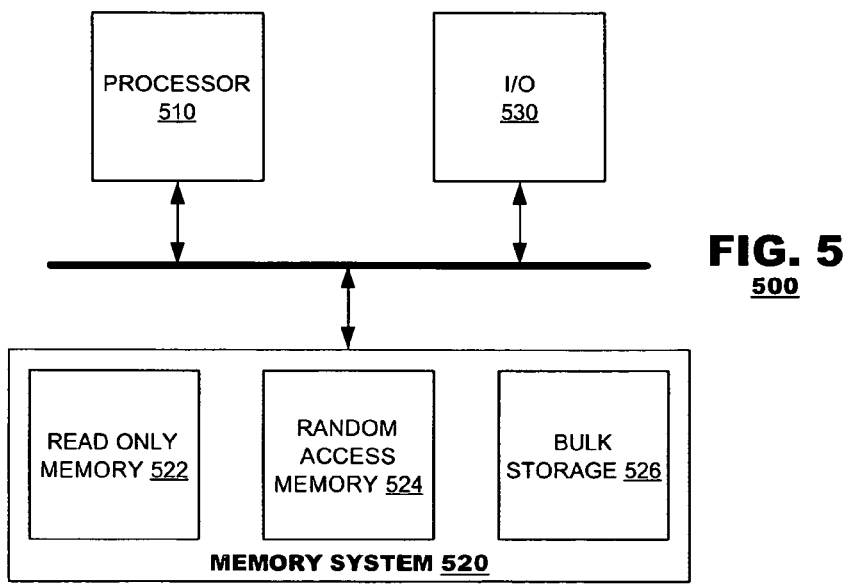

US 7,958,028 B2

ENTERPRISE MANAGEMENT APPLICATION PROVIDING AVAILABILITY CONTROL CHECKS ON REVENUE BUDGETS

BACKGROUND

"Enterprise management applications" ("EMAs") refer generally to a class of computer systems that organizations use to manage their operations. For example, to generate a purchase order or invoice in the course of an organization's business, the organization may compel their employees to engage an EMA and enter appropriate information representing the transaction to be performed. The EMA not only would generate the purchase order or invoice in question, it would validate the transaction being performed to ensure that it complies with predetermined procedural controls established by the organization and also would record data representing the transaction for integration with its financial applications, among others.

Availability Control ("AVC") systems perform one such validation operation. AVC systems validate expenditure transactions (e.g., purchase orders, vendor payments, payroll payments and the like) by comparing them to organizational budgetary requirements before validating the transaction. In this regard, the operation of EMA systems is well known.

Conventional AVC systems do not operate on revenue-generating transactions. For example, if an organization were to generate a customer invoice for performance of some service, no AVC check is performed because most organizations accept revenue from whatever sources are available.

Some organizations, however, particularly public sector organizations or non-governmental organizations (NGOs), are not free to accept revenue from any source that becomes available to it. Public sector organizations for public policy reasons, legislative proscription or other reasons, may choose to limit revenue that they receive to within predetermined limits. For example, a public sector organization may own some piece of equipment (e.g., a wind tunnel). If the organization were established for purposes of academic research, it may choose to lease use of the equipment to others to help sustain its operations. At the same time, it may choose to limit revenues it earns from such leases to remain faithful to its charter as an organization devoted to research.

In another example, an NGO may solicit grants from various donor organizations to support its operations. At the same time, the organization may limit the grant revenue that it receives from any single donor to maintain independence from that donor organization.

The inventors perceive a need in the art for an EMA system that manages revenues as they are received by an organization to compare them with predetermined requirements established for the organization.

BRIEF DESCRIPTION OF THE DRAWINGS

FIG. 4 is a flow diagram of a method according to an embodiment of the present invention.

FIG. 5 is a simplified block diagram of a processing system suitable for use with the present invention.

DETAILED DESCRIPTION

Figure 1:
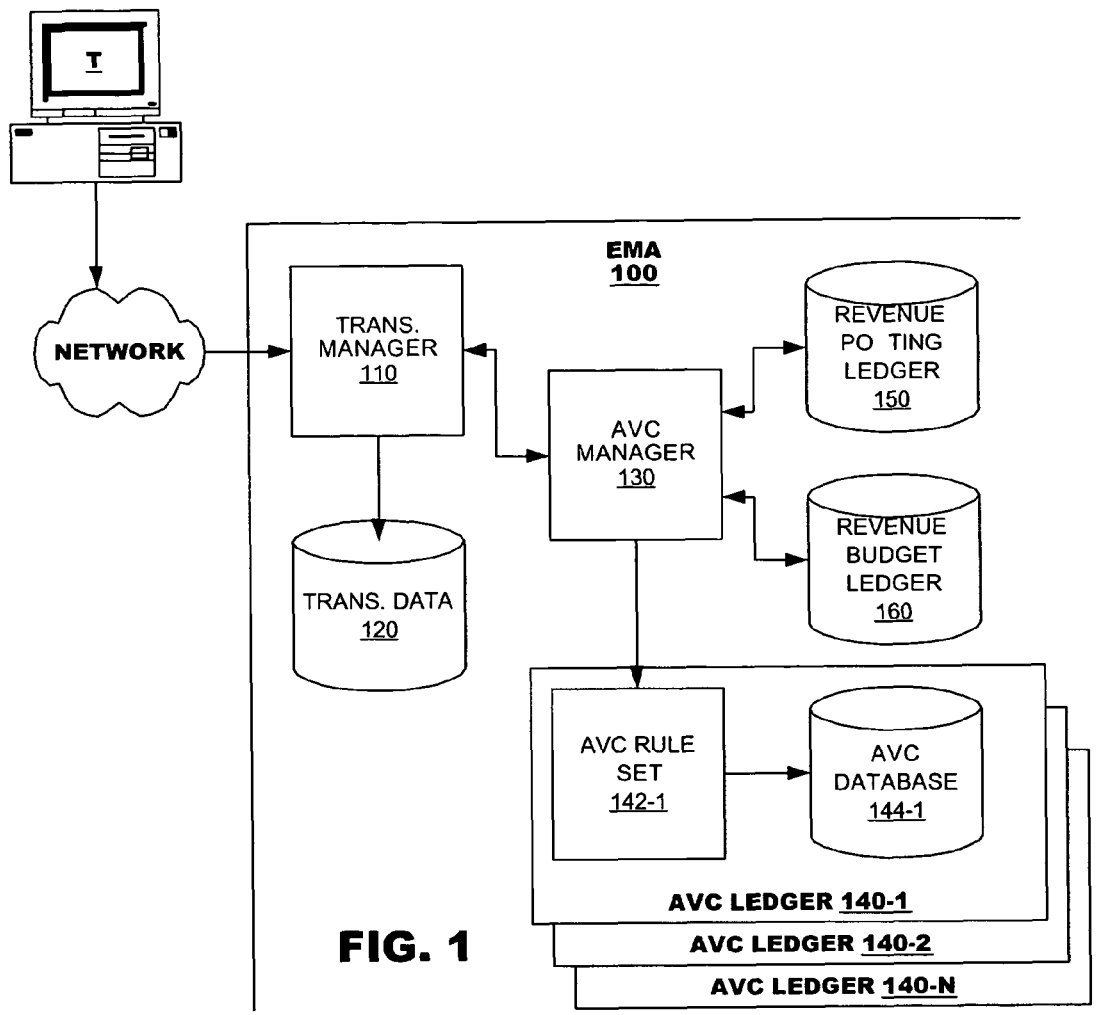
FIG. 1 is a functional block diagram of a revenue-based AVC control system 100 according to an embodiment of the present invention.

FIG. 1 is a simplified functional block diagram of an EMA system 100 according to an embodiment of the present invention. The EMA system 100 is shown as including a transaction manager 110, a transaction database 120, an AVC manager 130, one or more AVC ledgers 140-1, 140-2, 140-N, a revenue postings ledger database 150 and a revenue budget ledger database 160. Operators at terminal T interface with the EMA 100 via a communication network and generate various transactions, which are recorded in the transaction database 120. As is known, EMA systems 100 commonly include modules to manage human resources processes, materials management processes, financial processes and the like; such modules may be considered part of the transaction manager 110 for the purposes of the present discussion. Accordingly, the transaction manager 110 also includes conventional modules that manage revenue-generating events such as sales processes, financial accounts receivable management and the like.

The AVC manager 130 is an application that performs revenue-based AVC checks and implement responses thereto. The AVC manager 130 is supported by the revenue postings ledger database 150 and the revenue budget ledger database 160. The revenue postings ledger database 150 may store revenue items generated from various transactions performed by the organization and already admitted to the EMA system 100. The revenue budget ledger database 160 may include revenue budget items representing a budget defined for the organization. When a new transaction is proposed to the EMA system 100, the AVC manager 130 may refer to posting and budget items within these respective databases 150, 160 to determine if the new transaction is consistent with the limitations embodied by the various AVC rules.

The AVC rule set 142-1 includes control objects that represent the aggregation objects where defined AVC rules of the present invention are applied. These control objects may refer to aggregated revenue items and budget items, which may be found in the postings ledger database 150 and the revenue budget ledger database 160. The AVC ledger 140-1 also may include databases 144-1, which may store copies of the revenue postings and budget items. Thus, whereas the ledgers 150/160 may include items for all revenue postings/revenue budget admitted to the EMA system 100, the AVC database 144-1 may include aggregated values of the revenue postings/revenue budget items that are relevant to the control objects in the AVC rule set 142-1 to which the AVC database 144-1 corresponds. In this sense, the AVC database 144-1 may represent an 'aggregated view' into the revenue-generating transactions and revenue budget entries that are relevant to the control objects of the respective ledger 140-1.

During operation, when new revenue items or new budget values are proposed to the EMA system 100, the AVC manager 130 may execute the various AVC rules. If an error is generated therefrom, the AVC manager 130 may cause the transaction manager 110 to reject a proposed transaction that causes the error. Data representing admitted transactions may be stored in a variety of storage locations, including the transaction database 120, the postings ledger database 150, the budget ledger database 160, and any AVC ledger databases 144-1, 144-2, 144-N to which the admitted transaction is relevant.

Figures 2, 3:
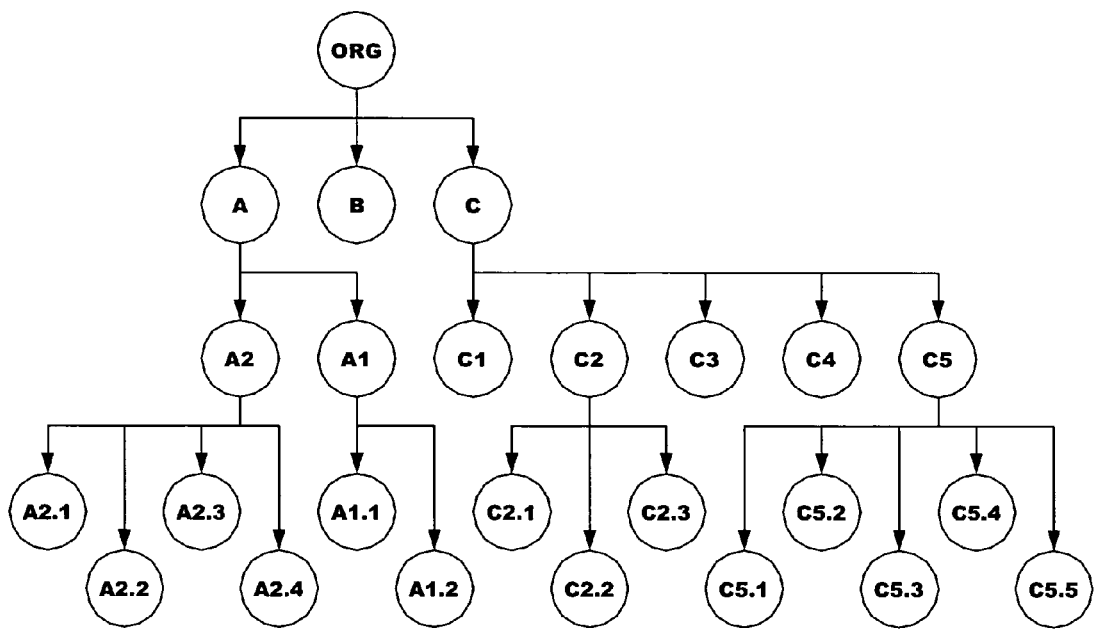
FIG. 2 illustrates a budget data structure for use with a posting ledger database or a budget ledger database according to an embodiment of the present invention.
FIG. 3 illustrates an exemplary AVC rule set according to an embodiment of the present invention.

The AVC management features might best be understood with reference to an example involving a hypothetical organization. Consider an organization composed of departments A, B and C. Department A may include sub-departments A1 and A2, department B may have no sub-departments and department C may have sub-departments C1, C2, C3, C4 and C5. FIG. 2 illustrates an exemplary budget data structure that might be used in connection within this organization to record revenue budget data. Revenue budget information may be recorded in one or more databases, organized not only by the department or sub-department to which the transaction relates but other dimensions including, for example, various projects for which revenue is expected to be earned or various assets (e.g., specialized equipment) for which the revenue is earned.

The budget data structure 200 of FIG. 2, therefore, may include various budget nodes to represent various dimensions along which revenue is to be recognized. Thus, the budget data structure includes budget nodes for department A, sub-departments A1 and A2 and revenue types A1.1, A1.2, A2.1, A2.2, A2.3 and A2.4. Some revenue types may be common to many different sub-departments but others may be unique to individual sub-departments. The architecture of the budget data structure depends on the business requirements of the organization it represents rather than any requirements imposed by the EMA system.

Although the budget data structure shown in FIG. 2 has been described in connection with the revenue budget database 160 of FIG. 1, the posting ledger database 150 may possess the same structure. When employed for postings, individual nodes of the budget data structure may store data representing revenue items posted by an EMA system as are relevant to the budget data structure. Thus, where the budget database 160 may store budget values developed according to a planning phase of the organization's operations, the posting database 150 may store revenue items representing revenue values recorded during the operations themselves.

FIG. 3 illustrates exemplary AVC rules 310-1, et seq., for use with the budget data structure of FIG. 2, according to an embodiment of the present invention. The AVC rules may include address fields 320 that point to data items in the posting database and the revenue budget database. They also may include a test field 330 that identify a relationship between the addressed data items that must be met to pass the associated rule. Further, the AVC rules may include a response field 340 that identifies an action to be taken if the AVC rule is violated. For each AVC rule a control object (in FIG. 3 listed left of the rule set table) is associated. The control object may be derived from the source addresses 320. It represents a storage location in the AVC ledger databases 144-1, 144-2, 144-N.

In embodiments where the posting database and the budget database employ identical budget data structure, it can be sufficient to use a single address field to address items in each database 150, 160. This may occur when revenue postings at predetermined dimensions of an organization are to be compared to budgetary values at the same dimensions. Of course, the principles of the present invention are not so limited. In other embodiments, control objects may include two types of address fields, one set of addresses referring to elements of the posting database and another referring to elements of the budget database.

According to other embodiments of the present invention, a control object may specify an aggregation scheme to employ among various addressed entries in the postings database, the budget database or both. For example, one control object may specify a straight summation of revenues and revenue budget values obtained from budgetary nodes A2, A2.1, A2.2, A2.3 and A2.4 before comparing these aggregated values against each other as specified in the test field. Control objects of other embodiments might specify a weighted summation or may permit a posted revenue to be included in a summation only if it meets some predetermined filtering criterion. Thus, the AVC system of the present invention provides a flexible computational scheme to fit different needs of the organizations that may use it.

According to another embodiment of the present invention, several parallel AVC ledgers 140-1, 140-2, 140-N may be used to include different sets of AVC rules and control objects.

Provision of multiple ledgers permits an organization to engage in a variety of different revenue-based AVC checks, which might be defined independently and implemented in parallel.

When a revenue transaction is received, an identifier of the donor organization may be compared to the filtering conditions of the various AVC rules sets 142-1, 142-2, 142-N (FIG. 1) and, if a match occurs, the AVC rules of the matching AVC rule set may be executed.

As noted, an AVC database (say, 144-1 FIG. 1) within an AVC ledger 140-1 may store aggregate data representing control objects and operands of the AVC rule test field 330 in the corresponding AVC rule set 142-1 and either the transaction data underlying such aggregates or pointers thereto. As such, an AVC ledger database establishes subsets of larger general transaction databases that commonly are used in an EMA system. For those operators that work with the control objects and the AVC rules, an AVC ledger database can become a convenient database with which to work. The operators may perform searches through the AVC ledger database in performance of their duties. In general, such ledger databases, although they may become large (e.g., recording thousands, tens of thousands or even hundreds of thousands of transactions) typically will be much smaller than the general transaction databases (recording perhaps millions of transactions). Thus, in EMA systems where it may be preferable to perform online database checks, requiring search results to become available in a near real time fashion, this reduction in size of the databases to be searched can be very useful.

FIG. 4 is a flow diagram of a method according to an embodiment of the present invention. According to the method, when a new revenue item is entered, the EMA system determines whether the revenue item is addressed by any control object of the AVC rule sets established (boxes 410-420). If so, the EMA system executes all AVC rules linked to the control object(s) (box 430). As noted, violation of an AVC rule may cause either an error or a warning as a response. If any AVC rule generates an error, the EMA system may block the revenue item from being admitted (box 440). If no AVC rule generates an error but one or more AVC rules generate a warning, the EMA system may generate a warning notification as dictated in the respective AVC rule(s) (box 450). Thereafter, or if the revenue item does not violate any AVC rule, the EMA system may admit the new revenue item (box 460).

Consider the revenue AVC system in operation. As described above, an organization may decide as a matter of policy that it will permit leases of its equipment up to only a certain percentage of its expected revenue. For example, the organization may design the following policies for revenue:

generate an error if the lease revenues for any single piece of equipment of a certain type (e.g., A2 and its subordinate nodes) meets or exceeds 50% of the revenue budget for such piece;

generate a warning of the total lease revenues for all pieces of another type of equipment (e.g., A1 and its subordinate nodes) reaches 30% of the total of revenue budgets for such pieces of equipment; and generate an error if the total lease revenues for all pieces of this type of equipment reach 40% of the total revenue budget for such pieces of equipment.

The exemplary control objects and AVC rules of FIG. 3 might be established to accommodate such a policy. Within the postings and budget structures, nodes A2.1-A2.4 might represent respective revenues and budgets attributable to four separate pieces of equipment owned by the organization. The control objects of FIG. 3 may establish AVC rules that govern revenue for such organizations.

Consider, as a further example, a scenario where postings values and budgetary values are established (using the budget data structure of FIG. 2) as shown in Table 1.

TABLE 1

| NODE | POSTINGS VALUE | REF BUDGET VALUE |
| --- | --- | --- |
| A1 | 0 | 90 |
| A1.1 | 10 | 0 |
| A1.2 | 10 | 10 |
| A2 | 0 | 10 |
| A2.1 | 0 | 25 |
| A2.2 | 10 | 25 |
| A2.3 | 10 | 25 |
| A2.4 | 10 | 25 |

Operation of the control objects of the AVC rule set of FIG. 3 would generate operand values as shown in Table 2.

TABLE 2

| CONTROL OBJECT | POSTINGS OPERAND | BUDGET OPERAND |
| --- | --- | --- |
| A1 | 20 | 100 |
| A2 | 0 | 10 |
| A2.1 | 0 | 25 |
| A2.2 | 10 | 25 |
| A2.3 | 10 | 25 |
| A2.4 | 10 | 25 |

Here, the postings operand for each control object represents the sum of all postings revenues referenced by the control object and the budget operand represents the sum of all revenue budget values referenced by the same control object.

If a new transaction were proposed that would increase revenue of node A1.1 to 25 and of node A2.2 to 15, then operation of the control objects would occur as shown in Table 3.

TABLE 3

| CONTROL OBJECT (AVC RULE) | POSTINGS OPERAND | BUDGET OPERAND | RESULT |
| --- | --- | --- | --- |
| A1 (310-1) | 35 | 100 | — |
| A1 (310-2) | 35 | 100 | Warning |
| A2 (310-3) | 0 | 10 | — |
| A2.1 (310-4) | 0 | 25 | — |
| A2.2 (310-5) | 15 | 25 | Error |
| A2.3 (310-6) | 10 | 25 | — |
| A2.4 (310-7) | 10 | 25 | — |

As shown above, the AVC rule 310-5 for control object A2.2 would be violated because the postings value in node A2.2 is more than 50% of the budget value for the same node. In this case, control object A2.2 (AVC rule 310-5) would generate an error and the transaction would be blocked. Additionally, an AVC rule for control object A1 (310-2) would be violated because the postings operand (the sum of all values in nodes A1, A1.1 and A1.2) exceeds 30% of the budget operand. The AVC rule for control object A1 (AVC rule 310-2) would generate a warning notification, which by itself would not cause rejection of the proposed revenue postings.

Consider another transaction, which increases the posting value of node A1.2 to 40 and of node A2.1 to 12.

TABLE 4

| CONTROL OBJECT (RULE) | POSTINGS OPERAND | BUDGET OPERAND | RESULT |
| --- | --- | --- | --- |
| A1 (310-1) | 50 | 100 | Error |
| A1 (310-2) | 50 | 100 | Warning |
| A2 (310-3) | 0 | 10 | — |
| A2.1 (310-4) | 12 | 25 | — |
| A2.2 (310-5) | 10 | 25 | — |
| A2.3 (310-6) | 10 | 25 | — |
| A2.4 (310-7) | 10 | 25 | — |

Thus, the transaction would be rejected because the postings operand of the control object A1 (AVC rule 310-1) is more than 40% of the associated budget operand, resulting in an error message from AVC rule 310-1. However, the system would in this case not issue the warning message from violation of the AVC rule 310-2, because the same control object A1 is concerned.

The foregoing discussion has presented AVC checks operating in the context of proposed transactions that increase posted revenue. In an embodiment, the principles of the present invention also find application for transactions that modify revenue budget as well. An operator at terminal T (FIG. 1) may propose a transaction to the EMA system 100 that would cause a reduction in revenue budget for a particular entity within an organization perhaps as a transfer of revenue budget between entities of an organization. In response, the transaction manager 110 may cause the AVC manager 130 to execute AVC rules from among the AVC rule sets 142-1 to 142-N. A violation of any AVC rule may indicate that the proposed budget revision violates a revenue constraint policy established for the organization or revenue entries already admitted to the system. In response, the AVC manager 130 may cause the transaction manager 110 to reject the proposed budget revision.

The foregoing embodiments may provide a software implemented AVC system. As such, these embodiments may be represented by program instructions that are to be executed by a server or other common computing platform. One such platform 500 is illustrated in the simplified block diagram of FIG. 5. There, the platform 500 is shown as being populated by a processor 510, a memory system 520 and an input/output (I/O) unit 530. The processor 510 may be any of a plurality of conventional processing systems, including microprocessors, digital signal processors and field programmable logic arrays. In some applications, it may be advantageous to provide multiple processors (not shown) in the platform 500. The processor(s) 510 execute program instructions stored in the memory system. The memory system 520 may include any combination of conventional memory circuits, including electrical, magnetic or optical memory systems. As shown in FIG. 5, the memory system may include read only memories 522, random access memories 524 and bulk storage 527. The memory system not only stores the program instructions representing the various methods described herein but also can store the data items on which these methods operate. The I/O unit 530 would permit communication with external devices (not shown).

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A computer-implemented enterprise management system, comprising:
   a revenue budget ledger database configured to store a plurality of revenue budget items representing a budget defined for an organization utilizing an enterprise management application;
   a revenue budget postings ledger database configured to store revenue items generated from various transactions and already admitted to the enterprise management system;
   a plurality of Availability Control ledgers of an Availability Control system, each ledger comprising an Availability Control rule set related to a control object(s), and a database configured to store aggregated values of revenue budget items from the revenue budget ledger database and revenue items from the revenue budget postings ledger database that are operands to the control object(s) in the Availability Control rule set of the ledger;
   a transaction manager configured to execute on a computer processor, the computer processor configured to:
      receive new revenue transactions which include a revenue value,
      store the new revenue transactions in a transactions database, and
      determine whether each new revenue transaction affects any control objects listed in any one of said Availability Control ledgers;
   an Availability Control manager, configured to execute on the computer processor, the computer processor configured to:
      receive from the transaction manager an indication of the control object affected by the new revenue transaction and the revenue value of the new revenue transaction;
      responsive to receipt of the new revenue value obtained from the received new revenue transaction, access an Availability Control rule in one of the plurality of Availability Control ledgers containing the aggregated values of revenue items from the revenue budget postings ledger database and revenue budget items relevant to the affected control object,
      compare an aggregated value of previously-posted revenue value retrieved from a source address in the Availability Control rule related to the affected control object with a new aggregated value including the revenue value of the new revenue transaction;
      determine from the result of the comparison, whether a limit to how much revenue may be posted for the control object has been exceeded according to a relationship defined by the Availability Control rule, and cause the transaction manager to reject the new revenue transaction based on the results of the determination.

2. The computer-implemented enterprise management system of claim 1, wherein the aggregated values are generated according to an aggregation scheme for executing the Availability Control rule, the aggregation scheme identifying a type of summation to be performed on the revenue items and revenue budget items.

3. An Availability Control method for an Availability Control system, the method comprising:
   determining, by a computer processor, in response to a proposed posting of a new revenue transaction to an enterprise management application, whether a revenue calculation of any control objects stored in one of a plurality of Availability Control ledgers would use a new revenue value from the proposed posting of the new revenue transaction in a revenue calculation, wherein each ledger of the plurality of Availability Control ledgers comprises an Availability Control rule set related to at least one of a plurality of control objects, and a database for storing aggregated values of revenue budget items from a revenue budget ledger database and revenue items from a revenue budget postings ledger database that are operands to at least one of a plurality of control object in the Availability Control rule set of the ledger;
   identifying, by a computer processor, at least one of the plurality of control objects as a control object using the proposed posting of the new revenue transaction in a revenue calculation;
   executing, by a computer processor, Availability Control rules from the Availability Control ledger for each identified control object, the Availability Control rules testing whether the proposed posting of the new revenue transaction would cause revenue limits to be exceeded for the identified control object in the Availability Control rule set of the Availability Control ledger, and
   rejecting the proposed posting from being admitted to an enterprise management system, if any Availability Control rule is violated by the proposed posting of the new revenue transaction and if the Availability Control rule identifies the violation as an error wherein a rule is violated when admitting the posting would cause revenue limits to be exceeded for the identified control object.

4. The Availability Control method of claim 3, wherein the executing comprises:
   retrieving from an Availability Control database of the Availability Control ledger containing the identified control object, a postings operand generated from an aggregation of previously-admitted postings of revenue values or items addressed by the control object, and
   determining whether the postings operand satisfies a test relationship stored in the rule set of the Availability Control ledger specified for the identified control object.

5. The Availability Control method of claim 3, wherein the executing comprises:
   retrieving from an Availability Control database of the Availability Control ledger containing the identified control object, a postings operand generated from an aggregation of previously admitted postings of revenue values or items addressed by the control object and a new revenue value, and
   determining whether the postings operand satisfies a test relationship stored in the rule set of the Availability Control ledger specified for the identified control object.

6. The Availability Control method of claim 5, further comprising storing the postings operand in the database of the Availability Control ledger associated with the control object.

7. The Availability Control method of claim 3, further comprising performing the determining, the executing and, if necessary the rejecting blocking for each of a plurality of Availability Control rule sets related to the identified control object.

8. A computer readable medium with program instructions stored thereon that, when executed, cause an executing device to:
responsive to a proposed postings of a new revenue transaction to an enterprise management application, determine whether a revenue calculation for any control objects stored in one of a plurality of Availability Control ledgers would use the new revenue transaction in a revenue calculation, wherein each ledger of the plurality of Availability Control ledgers comprises an Availability Control rule set related to at least one of a plurality of control objects, and a database for storing aggregated values of revenue budget items from a revenue budget ledger database and revenue items from a revenue budget postings ledger database that are operands to at least one of a plurality of control objects in the Availability Control rule set of the ledger;
identify the at least one of a plurality of control objects as a control object using the proposed posting in a revenue calculation;
execute Availability Control rules from the Availability Control ledger for each identified control object, the Availability Control rules testing whether the proposed postings of revenue would cause revenue limits to be exceeded for the identified control object in the Availability Control rule set of the Availability Control ledger, and
reject the posting from being admitted to an enterprise management system if any Availability Control rule is violated by the proposed revenue posting causing revenue limits to be exceeded for the identified control object and if the Availability Control rule identifies the violation as an error.

9. The computer readable medium of claim 8, having instructions stored thereon that further cause the executing device to:
retrieve from an Availability Control database of the Availability Control ledger containing the identified control object, a postings operand generated from an aggregation of previously-admitted postings of revenue values or items addressed by the control object, and
determine whether the postings operand satisfies a test relationship stored in the rule set of the Availability Control ledger specified for the control object.

10. The computer readable medium of claim 8, having instructions stored thereon that further cause the executing device to:
retrieve from an Availability Control database of the Availability Control ledger containing the identified control object, a postings operand generated from an aggregation of previously-admitted postings of revenue values or items addressed by the control object and a new revenue value, and
determine whether the postings operand satisfies a test relationship stored in the rule set of the Availability Control ledger specified for the control object.

11. The computer readable medium of claim 8, having instructions stored thereon that further cause the executing device to store the postings operand in the database of the Availability Control ledger associated with the control object.

12. The computer readable medium of claim 8, having instructions stored thereon that further cause the executing device to perform the determination, the execution and, if necessary the rejecting for each of a plurality of Availability Control rule sets related to the identified control object.

* * * * *